March 16, 1965
J. V. EAKIN
3,173,526
DRIVE ARRANGEMENT AND CLUTCH ASSEMBLY THEREIN
Filed Jan. 14, 1963
2 Sheets-Sheet 1
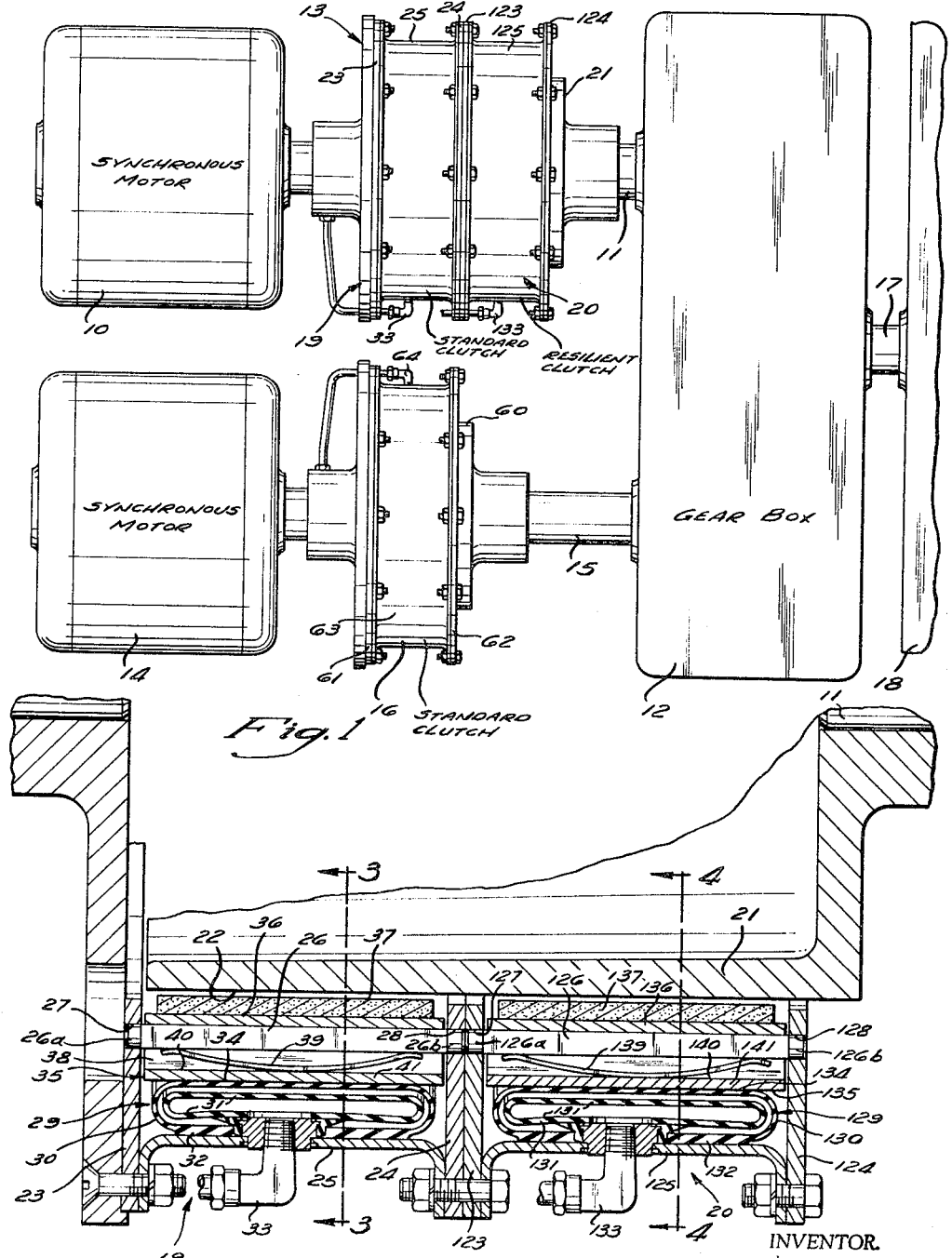
INVENTOR.
JOHN V. EAKIN
BY
William J. Flynn
ATTORNEY March 16, 1965  J. V. EAKIN  3,173,526
DRIVE ARRANGEMENT AND CLUTCH ASSEMBLY THEREIN
Filed Jan. 14, 1963  2 Sheets-Sheet 2

INVENTOR.
JOHN V. EAKIN
BY
William J. Flynn
ATTORNEY

United States Patent Office 3,173,526
Patented Mar. 16, 1965

3,173,526
DRIVE ARRANGEMENT AND CLUTCH ASSEMBLY THEREIN
John V. Eakin, Rocky River, Ohio, assignor to Fawick Corporation, a corporation of Michigan
Filed Jan. 14, 1963, Ser. No. 251,328
12 Claims. (Cl. 192—87)

This invention relates to a drive arrangement having two prime movers for separately supplying input power to a load common to both, and to a clutch assembly suitable for use in such a drive arrangement.

Drive arrangements have been proposed heretofore in which two synchronous electric motors drive a single load through a gear box driven by both motors. In such drive arrangements, difficulty has been encountered in equalizing the individual loads on the motors. Usually one of them will tend to carry substantially more of the load than the other.

The present invention is directed to a novel drive arrangement which enables the two input motors to share the load substantially equally. In accordance with the present invention, fluid-operated clutch assemblies are connected between the respective motors and the gear box common to both motors. One of these fluid-operated clutch assemblies is adjustable so as to enable the two motors to be phased together to substantially equalize the loads on them.

It is an object of this invention to provide a novel and improved drive arrangement for connecting two prime movers to a common load such that the two prime movers can share the load substantially equally.

It is also an object of this invention to provide such a drive arrangement in which fluid-operated clutches are employed.

Also, it is an object of this invention to provide a novel adjustable clutch assembly suitable for use in such a drive arrangement.

Further objects and advantages of this invention will be apparent from the following detailed description of a presently-preferred embodiment thereof, which is illustrated in the accompanying drawings.

In the drawings:

FIGURE 1 is a top plan view showing one embodiment of the present drive arrangement, with certain details omitted for simplicity and clarity;

FIGURE 2 is a fragmentary axial section showing the adjustable clutch assembly in the FIGURE 1 drive arrangement;

Figure 3:
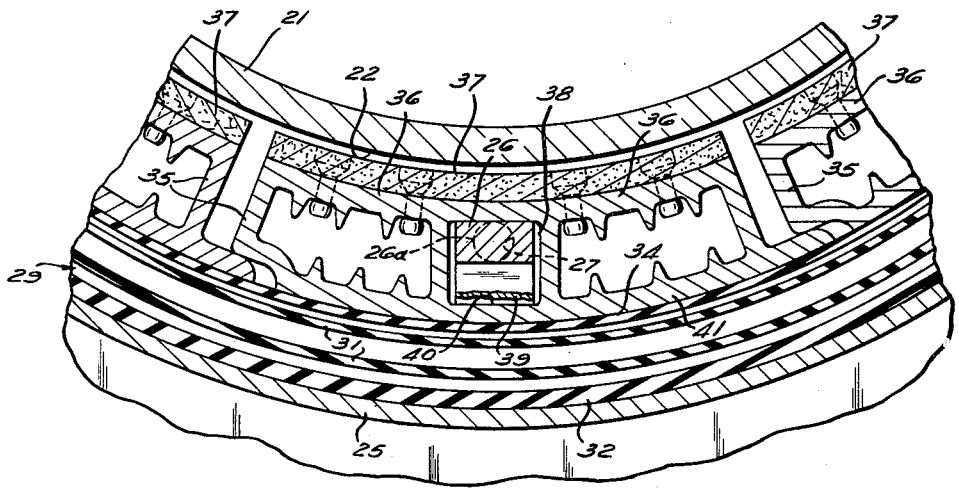
FIGURE 3 is a fragmentary radial section taken along the line 3—3 in FIGURE 2 and showing one of the clutch units in that assembly.

Referring first to FIGURE 1, the drive arrangement illustrated therein comprises a first synchronous electric motor 10, which drives one input shaft 11 of a gear box 12 through a novel adjustable clutch assembly 13, and a second synchronous electric motor 14, which drives another input shaft 15 of the same gear box through a clutch assembly 16. The gear box 12, which is of known design, has a single output shaft 17 driving a load device 18, such as a ball mill.

The novel clutch assembly 13 is composed of two clutch units 19 and 20 connected end-to-end and adapted to be applied and released alternatively so as to enable the motor 10 to be brought into phase with the other input motor 14. The clutch unit 19, referred to as a "standard" clutch, preferably is constructed substantially as disclosed in United States Letters Patent No. 2,870,891 to John V. Eakin et al. The clutch unit 20, referred to as the "resilient" clutch, preferably is constructed substantially as disclosed in United States patent application of John V. Eakin, Serial No. 251,119, filed concurrently herewith.

The clutch assembly 16, connected between the other motor 14 and the second input shaft 15 to the gear box, also is a "standard" clutch identical to the clutch unit 19.

Referring to FIGURE 2, the novel clutch assembly 13 of the present invention comprises a rotatable rigid drum 21 connected rigidly to the first input shaft 11 to the gear box. This drum presents a radially outwardly-facing, cylindrical, frictional-engagement face 22.

The "standard" clutch unit 19 in this novel clutch assembly includes this drum and an outer clutch structure driven by motor 10 and adapted for frictional, torque-sustaining engagement with the drum. As shown in FIGURE 2, this outer clutch structure includes a pair of rigid, axially spaced, radially disposed end plates 23 and 24. These end plates are rigidly connected to one another by a rigid ring 25, which is generally U-shaped in cross-section. This ring has its opposite end flanges bolted respectively to the end plates 23 and 24.

A plurality of substantially rigid, torque-transmitting bars 26 extend between the end plates 23 and 24 in torque-sustaining relationship with both. These torque-transmitting bars are disposed at equal radial distances from the conjoint axis of rotation of the drum 21 and the outer clutch structure and are spaced apart at equal intervals arcuately around the axis of the clutch unit. Each torque transmitting bar 26 throughout its extent between the end plates 23 and 24 is of oblong rectangular cross-section. Each torque-transmitting bar presents reduced opposite ends 26a and 26b of circular cross-section which are snugly received in corresponding holes 27 and 28 in the end plates 23 and 24, respectively. In this manner, each torque-sustaining bar 26 is rigidly supported by both end plates.

The connecting ring 25 rigidly supports a hollow, fluid-distensible, resilient, annular diaphragm or torque bag 29. This diaphragm or torque bag preferably comprises an outer hollow annulus 30 and an inner tube 31. Both of these members of the diaphragm are made of cord reinforced, vulcanized, soft rubber or other rubber-like material having suitable characteristics of deformability and resiliency. The outer annulus 30 of the diaphragm is vulcanized at its annular outside circumferential wall 32 to the inside of the spacer ring 25. A fluid inlet-outlet fitting 33 communicates with the interior of the inner tube 31 in the diaphragm. When fluid, preferably air, under pressure is introduced through this fitting into the inner tube, the diaphragm is distended radially inward. The outer annulus 30 of the diaphragm presents an annular inside circumferential wall 34 which moves radially inward when the diaphragm is so distended by fluid under pressure.

A plurality of substantially rigid, arcuate wear shoes 35 are disposed radially between the inside circumferential wall 34 of the diaphragm and the outwardly-facing frictional-engagement face 22 on the drum 21. These wear shoes are disposed in succession circumferentially around the drum.

Each wear shoe has an arcuate radially inside wall 36. An arcuately extending friction facing 37 is riveted to the wear shoe at this inside wall in confronting relationship to the frictional-engagement surface 22 on the drum 21.

Each of these wear shoes is formed with a central opening 38 (FIG. 3) which extends the entire axial length of the wear shoe and is generally rectangular in cross-section. This opening receives the respective torque-sustaining bar 26. As shown in FIGURE 3, there is a slight clearance between each side edge of this torque-sustaining bar and the adjacent side edge of this opening.

A bowed or arched leaf spring 39 is engaged under compression between the radially outward flat face of the torque-sustaining bar 26 and the radially outside surface 40 of the respective opening 38 in the wear shoe.

Each wear shoe has an arcuate, radially outside wall 41 which is positioned to be engaged by the inside circumferential wall 34 of the diaphragm.

Each wear shoe is separate from the diaphragm; it is not attached to or mounted upon the diaphragm.

Normally, each spring 39 biases the respective wear shoe 35 radially outward to a position in which its friction facing 37 is spaced a short distance radially outward from the frictional-engagement surface 22 on the drum 21 and its radially outside wall 41 is close to, or touching, the inside circumferential wall 34 of the diaphragm.

When fluid under pressure is supplied through fitting 33 to the diaphragm 29, the latter becomes distended radially inward to force the friction facings 37 on wear shoes 35 into frictional, torque-sustaining engagement with the drum, thereby coupling the shaft 11 to motor 10. There is a slight circumferential deflection or deformation of the outer clutch structure with respect to the drum each time this clutch unit carries the load. This deflection is believed to be due to slight flexing of the torque-sustaining bars 26 and/or deformation of the wear shoes 35 under load. In practice, the circumferential deflection is about .010 inch.

In most respects the "resilient" clutch unit 20 in this assembly is substantially identical to the "standard" clutch unit 19 just described. Corresponding elements of the clutch unit 20 are given the same reference numerals as in clutch 19, plus 100. The description of these elements will not be repeated.

The left end plate 123 of clutch unit 20 is bolted to the right end plate 24 of clutch unit 19, so that the outer structures of the two clutch units rotate in unison. The outer structure of clutch unit 20 also surrounds the same drum 21.

Figure 4:
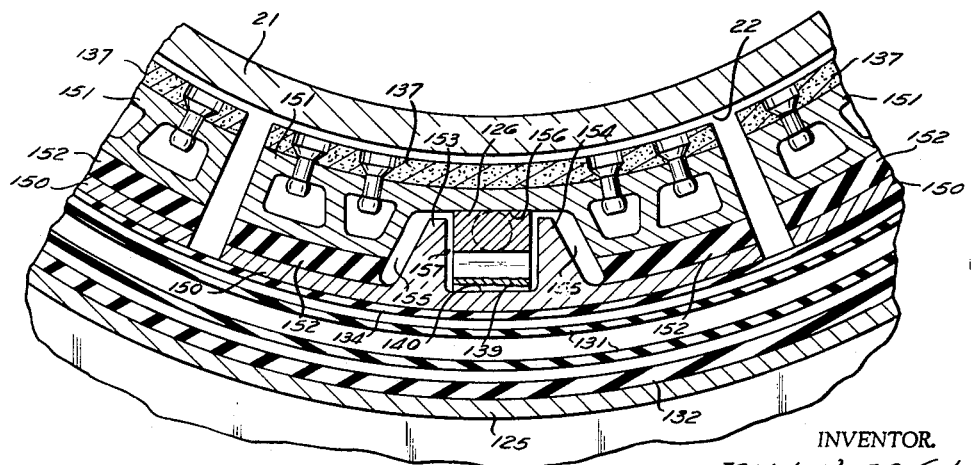
FIGURE 4 is a fragmentary radial section taken along the line 4—4 in FIGURE 2 and showing the other clutch unit in that assembly.

As shown clearly in FIGURE 4, each wear shoe in clutch unit 20 comprises a rigid outer backing plate 150, a rigid inner plate 151, and deformable and resilient material 152, preferably soft rubber, sandwiched between them and bonded to both. The friction facing 137 is riveted to the arcuate, radially inside face of the inner plate 151.

The outer plate 150 of each wear shoe is formed with radially inwardly extending projections 153 and 154. These projections both extend the entire axial length of the outer plate and they are spaced apart circumferentially on opposite sides of the axial centerline of this plate.

The inner plate 151 of each wear shoe is formed with a recess 155 which receives these projections 153 and 154. The bottom 156 of this recess and these projections together define a rectangular opening 157 which receives the respective rectangular torque-sustaining bar 126. There is a slight clearance between each side edge of the torque-sustaining bar and the adjacent projection 153 or 154.

A bowed leaf spring 139 is engaged under compression between the torque-sustaining bar 126 and the radially inside surface 140 on the outer plate 150 of the wear shoe between the projections 153 and 154. This spring serves the same purpose as the spring 39 in the "standard" clutch.

The rubber spacer material 152, which has an appreciable radial thickness, is sandwiched between the outer plate 150 and the inner plate 151 of each wear shoe and extends the entire axial length of these plates on opposite sides of the respective torque bar 126. Preferably, this rubber material is secured by vulcanized adhesion to both the outer and inner plates of the wear shoe.

Due to the resilient deformability of this rubber material 152 in each wear shoe, the outer structure of this clutch unit 20 is capable of appreciable deflection circumferentially of the drum 21 each time it is applied and carries the load. In practice, this circumferential deflection is substantially .025 inch each time.

The "standard" clutch 16 which couples the second motor 14 to the second input shaft to the gear box is substantially identical to the already described clutch unit 19.

It comprises an outer clutch structure connected to the shaft of motor 14 and an inner drum 60 connected to the gear box input shaft 15. The outer clutch structure includes a pair of axially spaced end plates 61 and 62 and a connecting ring 63 between them, as well as torque-sustaining bars, a fluid-distensible diaphragm and wear shoes arranged as described for the clutch unit 19. An inlet-outlet fitting 64 is provided for passing fluid under pressure iinto and out of the diaphragm in this clutch.

*Operation*

In the operation of this system, wattmeters are used to tell whether the electric motors 10 and 14 are carrying substantially equal loads.

Initially, both the clutch unit 19 and the clutch 16 are inflated (the "resilient" clutch unit 20 being disengaged) to couple the respective motors 10 and 14 to the gear box input shafts 11 and 15. Assuming that the wattmeters indicate that the two motors are substantially out of phase, with one carrying substantially more of the load and therefore using more electric power than the other, the clutch assembly 13 may be "stepped" or "walked" around the drum 21 until the two motors are substantially in phase.

This is done by applying the "resilient" clutch unit 20 and then releasing the "standard" clutch unit 19, and then re-applying clutch unit 19 and releasing clutch unit 20, and then re-applying clutch unit 20 and releasing clutch unit 19, and so on. Each time the "resilient" clutch unit 20 is applied and carries the load, a circumferential deflection of about .025 inch of the outer structure of this clutch with respect to the drum 21 is produced. Each time the "standard" clutch unit 19 is applied and carries the load, a circumferential deflection of about .010 inch is produced.

During this sequence of alternate applications of the clutch units 19 and 20, the drive from the motor 10 and shaft 11 is maintained because at any given instant one or the other of these clutch units is engaged. However, the resilient deflection which takes place each time one of these clutch units is applied and carries the load produces a corresponding change in the angular or rotational position of shaft 11 with respect to the shaft of motor 10. While this operation of the clutch units 19 and 20 is going on, the other clutch 16 is kept inflated to clutch the second motor 14 to the respective gear box input shaft 15.

When the wattmeters indicate that the respective loads on the motors are substantially equalized, then the clutch unit 19 or 20 which is then engaged is kept engaged, as is the clutch unit 16 for the second gear box input shaft 15.

While a presently-preferred embodiment of this invention has been described in detail and illustrated in the accompanying drawings, it is to be understood that various modifications, omissions and refinements which depart from the disclosed embodiment may be adopted without departing from the spirit and scope of this invention. For example, both clutch units in the clutch assembly 13 may be "resilient" clutches having an appreciable deflection, or both may be "standard" clutches having a smaller deflection without changing essentially the desired "walking" or "stepping" action to equalize the loads on the two motors.

I claim:
1. A drive arrangement comprising:
   a first prime mover;
   a second prime mover;
   a load common to both prime movers and having a first rotary input shaft to be driven by said first prime mover and a second rotary input shaft to be driven by said second prime mover;
   a first clutch assembly connected between said first prime mover and said first input shaft to the load, said first clutch assembly comprising a pair of clutches which are individually applicable and releasable, each of said clutches, when applied, cou- pling the first prime mover to said first input shaft to the load, at least one of said clutches being deflectable angularly under load, said clutches being selectively applicable and releasable alternatively to shift the angular rotational position of said first input shaft with respect to said first prime mover while maintaining the drive from said first prime mover to said first input shaft;

and clutch means connected between said second prime mover and said second input shaft to the load and, when applied, coupling said second prime mover to said second input shaft.

2. A drive arrangement comprising:
a first prime mover having a rotary output shaft;
a second prime mover having a rotary output shaft;
a load common to both prime movers and having a first rotary input shaft to be driven by the output shaft of said first prime mover and a second rotary input shaft to be driven by the output shaft of said second prime mover;
a clutch assembly connected between the output shaft of said first prime mover and said first input shaft to the load, said clutch assembly comprising a pair of clutches, each, when applied, coupling the output shaft of said first prime mover to said first input shaft to the load, at least one of said clutches being deflectable under load, means for selectively applying and releasing said clutches alternatively to shift the angular rotational position of said first input shaft with respect to the output shaft of said first prime mover while maintaining the drive from said first prime mover to said first input shaft;
and means coupling said output shaft of the second prime mover to said second input shaft to the load.

3. A drive arrangement comprising:
a first motor having a rotary output shaft;
a second motor having a rotary output shaft;
a load common to both motors and having a first rotary input shaft to be driven by the first motor and a second rotary input shaft to be driven by the second motor;
a clutch assembly comprising a driving clutch structure connected to the shaft of the first motor and a driven clutch structure connected to said first input shaft to the load;
said driving clutch structure comprising a pair of clutch units;
each of said clutch units comprising a rigid rotatable support, a fluid-distensible diaphragm of rubber-like material carried by said support and rotatable therewith, a plurality of wear shoes operatively associated with said diaphragm and positioned to be moved thereby into frictional, torque-transmitting engagement with said driven clutch structure, said wear shoes being coupled in torque-transmitting relationship to said support;
said supports in the respective clutch units being rigidly connected to each other;
at least one of said clutch units being deflectable circumferentially under load;
means for selectively inflating and deflating said clutch units individually and alternatively to shift said driving clutch structure circumferentially with respect to said driven clutch structure while maintaining the torque-sustaining engagement between them;
and means coupling the shaft of said second motor to said second input shaft to the load.

4. A drive arrangement comprising:
a first motor having a rotary output shaft;
a second motor having a rotary output shaft;
a load common to both motors and having a first rotary input shaft to be driven by the first motor and a second rotary input shaft to be driven by the second motor;
a first clutch assembly comprising a drum connected to said first input shaft to the load and an outer clutch structure connected to the shaft of said first motor, said outer clutch structure surrounding said drum coaxial therewith and comprising a pair of clutch units;

each of said clutch units comprising a rigid rotatable support, a fluid-distensible, annular diaphragm of rubber-like material carried by said support and rotatable therewith and surrounding said drum, said diaphragm having an annular inside circumferential wall which is movable radially inward in response to inflation of the diaphragm by fluid under pressure, and a plurality of wear shoes at said inside circumferential wall of the diaphragm at successive locations circumferentially around the drum and positioned to be moved by said inside circumferential wall of the diaphragm radially inward into frictional, torque-transmitting engagement with the drum in response to inflation of the diaphragm, said wear shoes being coupled in torque-transmitting relationship to said support;

at least one of said clutch units in the outer clutch structure being deflectable circumferentially under load;

said supports in the respective clutch units being rigidly connected to each other;

means for selectively inflating and deflating said clutch units individually and alternatively while maintaining the frictional coupling between the outer clutch structure and the drum to cause the outer clutch structure to be displaced circumferentially of the drum;

and clutch means connected between the shaft of said second motor and said second input shaft to the load and, when applied, coupling said last-mentioned shafts to each other.

5. A torque-sustaining assembly comprising:
first and second relatively rotatable structures;
said first structure comprising a pair of torque-transmitting units;
each of said units comprising a rigid support, a fluid-distensible diaphragm of rubber-like material carried by said support, a plurality of wear shoes operatively associated with said diaphragm and movable thereby into frictional, torque-transmitting engagement with said second structure when said diaphragm is distended, said wear shoes being coupled in torque-transmitting relationship to said support;
said supports in the respective torque-transmitting units being connected to each other;
at least one of said torque-transmitting units being deflectable angularly under load;
and means for selectively inflating and deflating said diaphragms individually and alternatively to shift the relative angular positions of said structures while maintaining the torque-sustaining coupling between them.

6. A clutch assembly comprising:
a rotatable driving clutch structure;
and a rotatable driven clutch structure;
said driving clutch structure comprising a pair of clutch units;
each of said clutch units comprising a rigid rotatable support, a fluid-distensible diaphragm of rubber-like material carried by said support and rotatable therewith, a plurality of wear shoes operatively associated with said diaphragm and positioned to be moved thereby into frictional, torque-transmitting engagement with said driven clutch structure, said wear shoes being coupled in torque-transmitting relationship to said support;
said support in the respective clutch units being rigidly connected to each other;
at least one of said clutch units being deflectable circumferentially under load;

and means for selectively inflating and deflating said clutch units individually and alternatively to shift said driving clutch structure angularly with respect to said driven clutch structure while maintaining the torque-sustaining engagement between said clutch structures.

7. A clutch assembly comprising:

a rotatable drum;

a rotatable outer clutch structure surrounding said drum and coaxial therewith, said outer clutch structure comprising a pair of clutch units;

each of said clutch units comprising a rigid rotatable support, a fluid-distensible, annular diaphragm of rubber-like material carried by said support and rotatable therewith and surrounding said drum, said diaphragm having an annular inside circumferential wall which is movable radially inward in response to inflation of the diaphragm by fluid under pressure, and a plurality of wear shoes at said annular inside circumferential wall of the diaphragm at successive locations circumferentially around the drum and positioned to be moved by said inside circumferential wall of the diaphragm radially inward into frictional, torque-transmitting engagement with the drum in response to inflation of said diaphragm by fluid under pressure, said wear shoes being coupled in torque-transmitting relationship to said support;

at least one of said clutch units in the outer clutch structure being deflectable circumferentially under load;

said suports in the respective clutch units being connected rigidly to each other;

and means for selectively inflating and deflating said clutch units individually and alternatively while maintaining the frictional coupling between the outer clutch structure and the drum to cause the outer clutch structure to be displaced circumeferentially of the drum.

8. The clutch assembly of claim 7, wherein each of said clutch units in the outer clutch structure is deflectable circumferentially under load.

9. The clutch assembly of claim 7, wherein each of the wear shoes in said circumferentially deflectable clutch unit comprises a substantially rigid inner plate disposed toward said drum, a substantially rigid outer plate disposed toward said inside circumferential wall of the diaphragm, and deformable and resilient rubber-like material sandwiched between said inner and outer plates and bonded to both.

10. A drive arrangement comprising:

a first prime mover having a rotary output shaft;

a second prime mover having a rotary output shaft;

a load common to both prime movers and having a first rotary input shaft to be driven by the output shaft of said first prime mover and a second rotary input shaft to be driven by the output shaft of said second prime mover:

a clutch assembly connected between the output shaft of said first prime mover and said first input shaft to the load, said clutch assembly comprising a pair of clutches, each, when applied, coupling the output shaft of said first prime mover to said first input shaft to the load, each of said clutches being deflectable circumferentially under load, means for selectively applying and releasing said clutches alternatively to shift the angular rotational position of said first input shaft with respect to the output shaft of said first prime mover while maintaining the drive from said first prime mover to said first input shaft;

and means coupling said output shaft of the second prime mover to said second input shaft to the load.

11. A drive arrangement comprising:

a first motor having a rotary output shaft;

a second motor having a rotary output shaft;

a load common to both motors and having a first rotary input shaft to be driven by the first motor and a second rotary input shaft to be driven by the second motor;

a first clutch assembly comprising a drum connected to said first input shaft to the load and an outer clutch structure connected to the shaft of said first motor, said outer clutch structure surrounding said drum coaxial therewith and comprising a pair of clutch units;

each of said clutch units comprising a rigid rotatable support, a fluid-distensible, annular diaphragm of rubber-like material carried by said support and rotatable therewith and surrounding said drum, said diaphragm having an annular inside circumferential wall which is movable radially inward in response to inflation of the diaphragm by fluid under pressure, and a plurality of wear shoes at said inside circumferential wall of the diaphragm at successive locations circumferentially around the drum and positioned to be moved by said inside circumferential wall of the diaphragm radially inward into frictional torque-transmitting engagement with the drum in response to inflation of the diaphragm, said wear shoes being coupled in torque-transmitting relationship to said support;

each of said clutch units in the outer clutch structure being deflectable circumferentially under load;

said supports in the respective clutch units being rigidly connected to each other;

means for selectively inflating and deflating said clutch units individually and alternatively while maintaining the frictional coupling between the outer clutch structure and the drum to cause the outer clutch structure to be displaced circumferentially of the drum;

and clutch means connected between the shaft of said second motor and said second input shaft to the load and, when applied, coupling said last-mentioned shafts to each other.

12. A drive arrangement comprising:

a first motor having a rotary output shaft;

a second motor having a rotary output shaft;

a load common to both motors and having a first rotary input shaft to be driven by the first motor and a second rotary input shaft to be driven by the second motor;

a first clutch assembly comprising a drum connected to said first input shaft to the load and an outer clutch structure connected to the shaft of said first motor, said outer clutch structure surrounding said drum coaxial therewith and comprising a pair of clutch units;

each of said clutch units comprising a rigid rotatable support, a fluid-distensible, annular diaphragm of rubber-like material carried by said support and rotatable therewith and surrounding said drum, said diaphragm having an annular inside circumferential wall which is movable radially inward in response to inflation of the diaphragm by fluid under pressure, and a plurality of wear shoes at said inside circumferential wall of the diaphragm at successive locations circumferentially around the drum and positioned to be moved by said inside circumferential wall of the diaphragm radially inward into frictional torque-transmitting engagement with the drum in response to inflation of the diaphragm, said wear shoes being coupled to torque-transmitting relationship to said support;

at least one of said clutch units in the outer clutch structure being deflectable circumferentially under load;

each of said wear shoes in the circumferentially deflectable clutch unit comprising a substantially rigid inner plate disposed toward said drum, a substantially rigid outer plate disposed toward said inside circumferential wall of the diaphragm, and deformable and resilient rubber-like material sandwiched between said inner and outer plates and bonded to both;

said supports in the respective clutch units being rigidly connected to each other;

means for selectively inflating and deflating said clutch units individually and alternatively while maintaining the frictional coupling between the outer clutch structure and the drum to cause the outer clutch structure to be displaced circumferentially of the drum;

and clutch means connected between the shaft of said second motor and said second input shaft to the load and, when applied, coupling said last-mentioned shafts to each other.

References Cited by the Examiner
UNITED STATES PATENTS

| | | | |
|---|---|---|---|
| 2,155,434 | 4/39 | Marsh | 74—661 |
| 2,707,618 | 5/55 | Brown | 74—661 |
| 2,747,711 | 5/56 | Schmitter et al. | 192—87 |
| 3,037,602 | 6/62 | Clements | 192—87 |
| 3,091,930 | 6/63 | Thoma et al. | |

DAVID J. WILLIAMOWSKY, *Primary Examiner.*

UNITED STATES PATENT OFFICE
CERTIFICATE OF CORRECTION

Patent No. 3,173,526                      March 16, 1965

John V. Eakin

It is hereby certified that error appears in the above numbered patent requiring correction and that the said Letters Patent should read as corrected below.

Column 6, line 72, for "support" read -- supports --; column 8, line 67, for "to" read -- in --.

Signed and sealed this 3rd day of August 1965.

(SEAL)
Attest:

ERNEST W. SWIDER
Attesting Officer

EDWARD J. BRENNER
Commissioner of Patents